United States Patent [19]
Jackovich et al.

[11] Patent Number: 4,486,801
[45] Date of Patent: Dec. 4, 1984

[54] GENERATOR SHORTED DIODE PROTECTION SYSTEM

[75] Inventors: Melvin C. Jackovich, Stillman Valley; William Spencer, Rockford; James B. Thom, Rock City, all of Ill.

[73] Assignee: Sundstrand Corporation, Rockford, Ill.

[21] Appl. No.: 340,618

[22] Filed: Jan. 19, 1982

Related U.S. Application Data

[63] Continuation-in-part of Ser. No. 205,383, Nov. 10, 1980, abandoned.

[51] Int. Cl.³ .............................................. H02H 7/06
[52] U.S. Cl. ........................................ 361/21; 361/79; 322/59; 322/69
[58] Field of Search ............... 361/20, 21, 18, 91, 361/86, 79; 322/28, 59, 69

[56] References Cited

U.S. PATENT DOCUMENTS

| 3,210,603 | 10/1965 | Calfee et al. | 361/20 |
| 3,478,286 | 11/1969 | Dervan | 361/21 |
| 3,534,228 | 10/1970 | Hyvarinen et al. | 361/20 |
| 3,705,331 | 12/1972 | South et al. | 361/20 |
| 4,219,769 | 8/1980 | MacFarlane et al. | 322/59 X |
| 4,321,681 | 3/1982 | Sackin et al. | 361/79 X |

FOREIGN PATENT DOCUMENTS

398005 9/1933 United Kingdom .................. 322/69

Primary Examiner—Reinhard J. Eisenzopf
Attorney, Agent, or Firm—Harold A. Williamson; Ted E. Killingsworth; Michael B. McMurry

[57] ABSTRACT

This invention relates to a shorted diode protection system for a brushless alternating current generator of the type having an energizeable exciter field winding. The system includes a circuit arrangement for sensing the voltage difference across the exciter field and pairing the voltage difference with generator load current to thereby provide an output signal that falls within a predictable range of values over a normal generator load current range. The output signal is of such a nature that it falls within a higher range of values upon the occurrence of a shorted diode. Another circuit arrangement is responsive to the output signal such that whenever the output signal exceeds a preset value over the normal load current range, an output is generated that operates to cause the interruption of the exciter field.

12 Claims, 5 Drawing Figures

GENERATOR SHORTED DIODE PROTECTION SYSTEM

This application is a continuation-in-part of our co-pending application Ser. No. 205,383 filed Nov. 10, 1980 now abandoned.

TECHNICAL FIELD

This invention relates to a shorted diode protection system for a brushless alternating current generator.

BACKGROUND ART

The creation many years ago of brushless alternating current generators in which field excitation is supplied from an alternating current exciter and a rotating rectifier assembly have always faced the inherent problem of detecting a shorted diode in the rotating rectifier assembly. The presence of a shorted diode in the rectifier assembly establishes an intermittent short-circuit across the exciter winding and if the exciter field excitation is maintained, heavy short-circuit currents will flow in the exciter armature winding. These heavy short-circuit currents can result in extensive damage or destruction of the exciter and possible damage to the main generator and other system components.

Amongst the effective solutions to these shorted diode problems is that put forward in the Calfee et al U.S. Pat. No. 3,210,603. The Calfee et al patent shows a rotating field generator in which the exciter field current is monitored and the field circuit interrupted upon failure of a rotating diode. A current transformer couples a signal representing the current to a diode bridge rectifier and RC filter. Upon failure of a diode, the AC ripple in the field circuit increases in amplitude and decreases in frequency. The rectified voltage from the diode bridge rectifier and RC filter increases in amplitude and actuates a relay to open the field circuit. The aforementioned is additionally effective to isolate the direct current component of the field current from the alternating current component. It is recognized that the design of the current transformer is critical since the transformer is biased with direct current. The direct current bias being equal to the average exciter field amperes. This direct bias requires a heavy and costly transformer. The invention to be described hereinafter requires no transformer and is free from any of the problems of isolation attendant with the detection of a current component.

Another solution to the shorted diode problem is that set forth in the Hyvarinen et al U.S. Pat. No. 3,534,228, which shows a sensing circuit including a series resistor in the exciter field circuit with a voltage transformer connected across the resistor through a DC blocking capacitor. The voltage output of the transformer is connected through an RC filter to a diode bridge rectifier and to a field current regulator. The Hyvarinen et al patent requires an AC conductive coupling circuit to the exciter field, to produce an AC error voltage proportional to the oscillation or ripple in the field current. Shorted diode protection is afforded by means for limiting the exciter field current when an AC error voltage exceeds a reference. The invention to be described hereinafter provides shorted diode protection without the need for the inclusion of heavy current components in the field circuit lines thereby reducing the possibility, overall, of component failure as a factor in the reliability of the shorted diode detection.

Yet another solution to the shorted diode protection is the differential protection system shown and described in the South, et al U.S. Pat. No. 3,705,331. South, et al is directed to a differential protection system for an A.C. generator in which there is provided exciter fault detection based on a comparison of signals from the exciter and from the generator armature. A signal representing the voltage across two phases of the armature is connected in series with a signal representing the current through the third phase. The vectorial sum of these two signals is rectified and filtered, providing a measure of real power delivered by the generator. The generator power signal is summed with a signal developed across the exciter field winding and the absolute value of the difference actuates a relay to give an alarm or shut down the machine.

The invention to be described hereinafter distinguishes over South, et al, in that the inventive contribution is not directed to a differential protection system of the type described by South, et al, and defined by the IEEE Standard Dictionary of Electrical Terms—IEEE Std.—1977 as published by The Institute of Electrical and Electronic Engineers, Inc. at page 178, which reads as follows: "Differential Protection. A method of apparatus protection in which an external fault is identified by comparing electrical conditions at all terminals of the apparatus." The invention to be described more fully hereinafter distinguishes over the South, et al contribution in that there provides a sensing of the voltage difference across the exciter field and a pairing of the voltage difference with generator load current the instant the voltage difference is sensed. A microprocessor is provided that has stored therein a range of preset values over a normal generator load current range such that when a voltage difference detected across the exciter field winding exceeds the stored value of the preset range of values, a relay is activated to interrupt the energization of the exciter field.

DISCLOSURE OF INVENTION

This invention relates to a shorted diode protection system for a brushless alternating current generator of the type having an energizeable exciter field winding. The system includes a circuit arrangement for sensing the voltage difference across the exciter field with respect to ground and pairing the voltage difference with generator load current to thereby provide an output signal that falls within a predictable range of values over a normal generator load current range. The output signal is of such a nature that it falls within a higher range of values upon the occurrence of a shorted diode. Another circuit arrangement is responsive to the output signal such that whenever the output signal exceeds a preset value over the normal load current range, an output is generated that operates to cause the interruption of the exciter field.

It is therefore a primary object of the invention to provide a brushless alternating current generator with shorted diode protection free from the need to detect and use field current or field current ripple to provide the protection.

Another object of the invention is to provide a shorted diode protection system for a brushless alternating current generator that detects a voltage difference across an exciter field winding and causes the energization of the exciter field to be interrupted whenever the voltage difference across the exciter field winding exceeds a preset value.

Yet another object of the invention is to utilize a microprocessor in a shorted diode protection system, which microprocessor has stored therein a range of preset values over a normal generator load current range such that when a voltage difference detected across the exciter field winding exceeds the stored value of the preset range of values, a relay is activated to interrupt the energization of the exciter field.

In the attainment of the foregoing objects, the invention contemplates that the generator will include in combination a stationary armature member and a rotatable member carrying a field winding. An exciter which has a stationary member carries an exciter field winding. The rotatable member also has rotatable therewith a rectifier assembly and an armature member. The rectifier assembly is electrically connected between the exciter armature member and the generator field winding to supply thereto direct current excitation. A circuit is provided that supplies direct current to the exciter field winding.

The generator system further includes a circuit arrangement for sensing the voltage difference across the exciter field winding and pairing the voltage difference with generator load current to thereby provide an output signal that falls within a predictable range of values over a normal generator load current range. The output signal is of such a nature that it falls within a higher range of values upon the occurrence of a shorted diode. Another circuit arrangement is responsive to the output signal such that whenever the output signal exceeds a preset value over the normal load current range, an output is generated that operates to cause the interruption of the exciter field.

The circuit arrangement for sensing the voltage difference is electrically coupled across the exciter field winding and includes a multiplexer electrically coupled to the exciter field winding. A microprocessor is part of the other circuit arrangement which is also electrically coupled to the multiplexer. The multiplexer is adapted to receive signals from either side of the exciter field winding as well as a control signal from the microprocessor.

A load current sensing circuit is coupled to an output of the generator and has an output coupled to the multiplexer.

The circuit arrangement for sensing the voltage difference further includes an analog to digital converter electrically coupled to an output from the multiplexer. The converter provides the aforementioned output signal to the microprocessor, which output signal is in either the predictable range of values or is in the higher ranges of values upon the occurrence of a shorted diode.

The other circuit arrangement which is responsive to the output signal further includes a generator control relay driver electrically coupled to a relay. The actuation of the relay controls the interruption of the energization of the exciter field.

The microprocessor has stored therein a range of preset values over the normal load current range, such that whenever the output signal exceeds a preset value at any given load current in the normal range, the relay is activated to interrupt the exciter field. Finally, a resistance element is controllably electrically connected across the excitation field winding upon activation of the relay to thereby damp out any generator self excitation when a shorted diode is detected and the energization of the exciter field winding interrupted.

Other objects and advantages of the present invention will be apparent upon reference to the accompanying description when taken in conjunction with the following drawings:

BEST MODE FOR CARRYING OUT THE INVENTION

Figure 1:
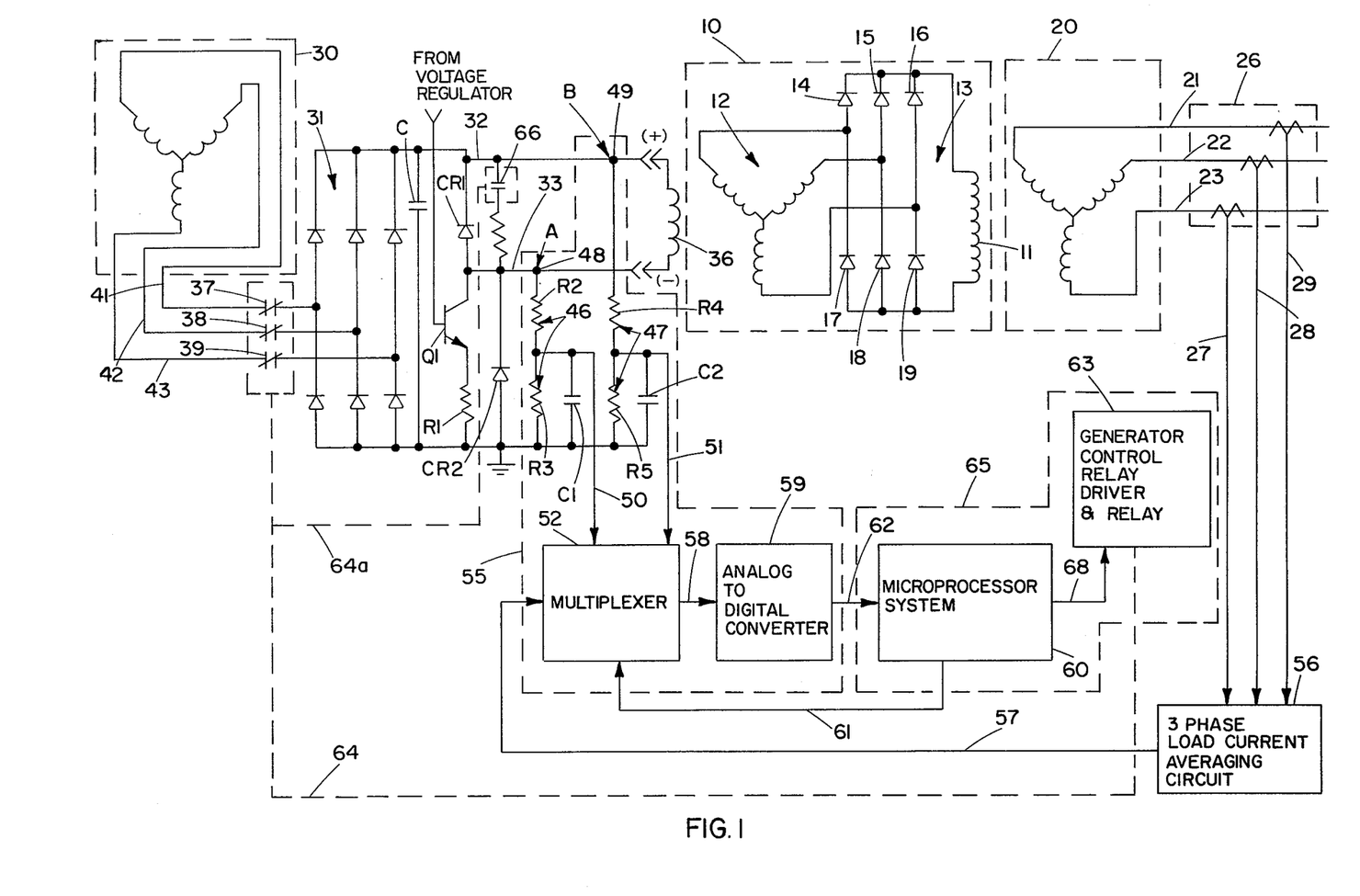
FIG. 1 is a schematic of a generator system embodying the invention.

Reference is now made to FIG. 1 which is a schematic of a brushless alternating current generator system embodying the invention. The generator is conventional in that it is provided with a rotatable assembly 10 which includes a rotatable shaft not shown, upon which there are mounted for rotation therewith a field winding 11, a three phase armature winding 12 and a rectifier assembly 13. The rectifier assembly 13 is electrically connected to the field winding 11 as shown and includes diodes 14, 15, 16, 17, 18 and 19. A three phase stator winding 20 is provided, which forms part of the stator structure not shown. Generator output conductors 21, 22 and 23 are depicted exiting the dotted outline of the three phase stator winding 20 and entering a current transformer arrangement designated by broken line box 26. The function of the current transformer arrangement 26 will be explained more fully hereinafter. A permanent magnet generator 30 of a conventional nature is employed in conjunction with a full wave rectifier bridge 31 along with conventional voltage regulator components such as transistor $Q_1$, capacitor C, resistor $R_1$, as well as diodes CR1 and CR2, which are in turn electrically interconnected as shown to electrical leads 32, 33 to either side of an exciter field winding 36. The exciter field winding 36 is mounted on a stator, not shown, and is provided with direct current excitation from permanent magnet generator 30 via the full wave rectifier bridge 31 through the electrical connections and components hereinbefore shown and described. A permanent magnet field member, not shown, driven from the main generator shaft, also not shown, results in and through connections and components, an exciter voltage being delivered to exciter field winding 36 whenever the main generator shaft is rotated. Normally closed breaker contacts 37, 38 and 39 are shown in leads 41, 42 and 43, which leads interconnect the permanent magnet generator 30 with full wave rectifier bridge 31. The opening of these normally closed breaker contacts 37, 38 and 39 will be explained more fully hereinafter. At this point in the description it is sufficient to note that the opening of these breaker contacts 37, 38 and 39 will interrupt the DC power to the exciter field winding 36.

A pair of voltage divider networks generally designated by reference numerals 46 and 47 and associated forked arrows are electrically connected respectively to lead 33 at point 48 and lead 32 at point 49. The voltage divider networks 46, 47 provide on leads 50 and 51 to a multiplexer 52 reduced voltage signals dependent upon the values selected for voltage divider resistors $R_2$, $R_3$, $R_4$, $R_5$, and voltage divider capacitors C1, C2.

A circuit arrangement 55 or sensing means shown in dotted outline senses the voltage difference across the exciter field winding 36 and pairs the voltage difference with generator load current in the manner to be set forth hereinafter. The multiplexer as previously noted continuously receives voltage signals on leads 50, 51 which voltage signals are directly proportional to the voltage sensed on either side of exciter field winding 36 on the leads 32, 33.

The current transformer arrangement 26, shown schematically, continuously delivers on leads 27, 28 and 29 to a three phase load current averaging circuit 56 signals indicative of the load current the generator is being called upon to deliver. The load current averaging circuit 56 has a single output on lead 57 which is delivered to the multiplexer 52. The multiplexer 52 is controlled by a signal from a microprocessor system 60 via lead 61. The multiplexer 52 has a single output provided on lead 58 to an analog to digital converter 59. The analog to digital converter 59 converts the signal information on lead 58 to a digital form on lead 62 for use by the microprocessor system 60.

The microprocessor system 60 is programmed in a manner such that the multiplexer 52 under the control of the signal on lead 61 from the microprocessor sequentially admits and passes to its output 58 the reduced voltage signals on leads 50, 51 and average load current signal on lead 57. The sequence in which the voltage and load current are sampled is a matter of design dependent upon the microprocessor system program. In any event, for reasons that will become apparent hereinafter, the microprocessor requires a pair of conditions to be present to allow the microprocessor logic to determine if a voltage difference detected at a given average load current exceeds a preset value stored in the microprocessor for the given average load current. Whenever a difference voltage is detected that exceeds the stored preset value at a given load current, a signal is generated on lead 68 to a generator control relay driver and relay 63 which is activated and causes the interruption of the energization of exciter winding 36 by the opening of the normally closed breaker contacts 37, 38, 39 via the mechanical connection 64 shown in broken line form.

It will be observed that the mechanical connection 64 from generator control relay driver and relay 63 controls the closing of normally open breaker contact 66 via mechanical connection 64a. The closing of breaker contact 66 places resistor 67 across the leads 32, 33, to exciter field winding 36, thereby damping out any generator self-excitation whenever a shorted diode has been detected and the energization of the exciter field winding interrupted.

The microprocessor system 60 and the generator control relay driver and relay 63 are shown and included within broken line box 65 and represent a means responsive to an output signal on lead 62, such that whenever the output signal exceeds a preset value over the normal load current range, an output is generated on connection 64 that interrupts the energization of the exciter field winding 36.

Figure 2A:
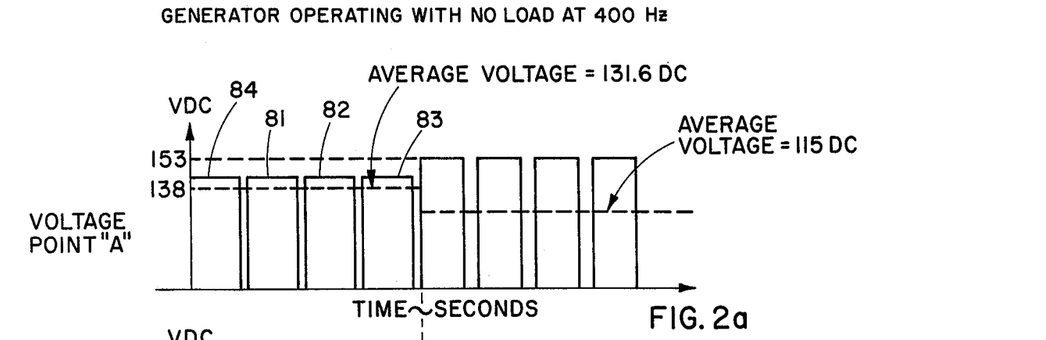
FIG. 2a through 2d are timing charts depicting the operational characteristics at various points in the generator system of FIG. 1, with and without the occurrence of a shorted diode.
Figure 2B:
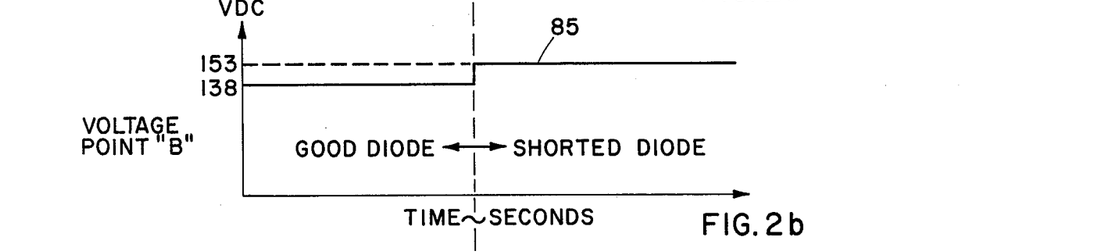
Figure 2C:
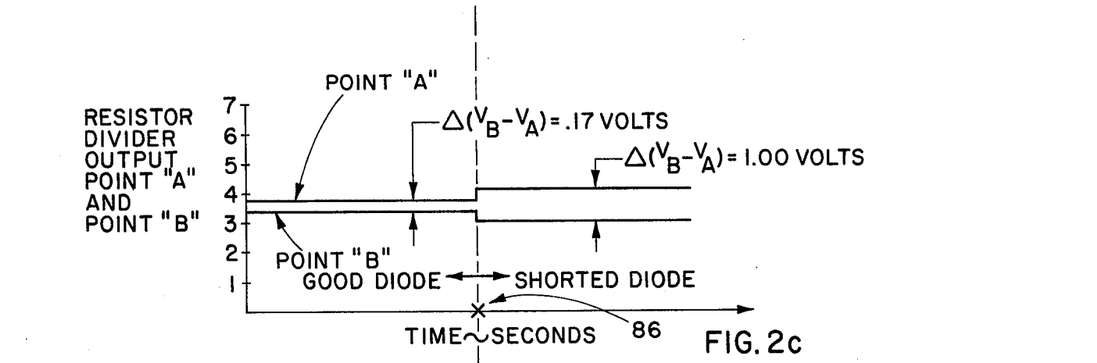
Figure 2D:
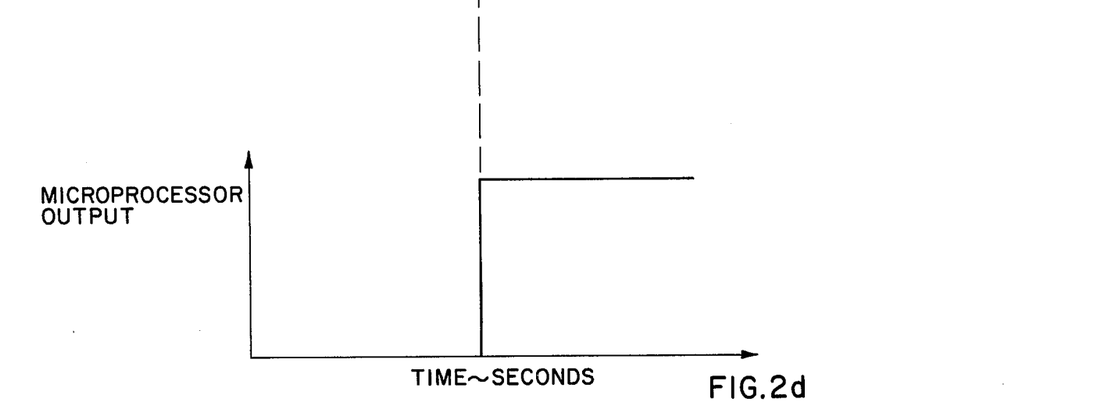
Figure 3:
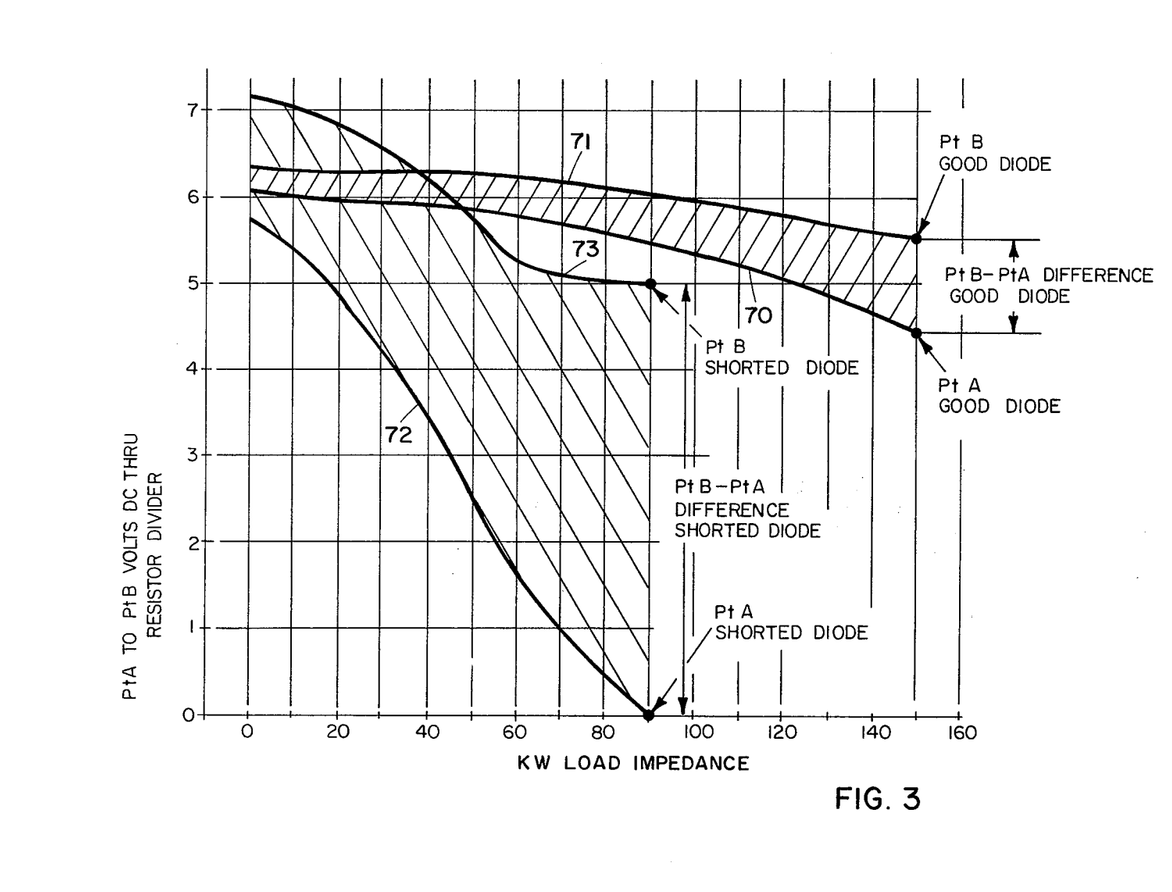
FIG. 3 is a plot of the voltage difference across a generator exciter winding over a normal load current range, with and without a shorted diode present.

Before the detailed operation of the system of FIG. 1 is described in conjunction with the signal timing charts of FIGS. 2a through FIG. 2d, attention is directed to FIG. 3 which graphically illustrates the phenomenon which the invention recognizes, detects and acts upon. Accordingly FIG. 3 is a plot of the voltage difference across a generator exciter winding such as the winding 36 in FIG. 1, plotted over a normal load current range with and without a shorted diode present.

In FIG. 1 the exciter field winding 36 has connected thereto at either end thereof, electrical leads 32 and 33. The reference character "A" and its associated arrow designate the point 48 on lead 33, while reference character "B" and its associated arrow designate the point 49 on lead 32.

When the diodes 14 through 19 of the rotating rectifier assembly 13 are in good operating condition, the voltage at point "A" is represented by voltage curve 70 as shown in FIG. 3 reduced by voltage divider network 46. Similarly, when the diodes 14 through 19 are in good operating condition, the voltage at point "B" is represented by voltage curve 71. At any given load current, the distance between the voltage curves 70, 71 represents the voltage difference across the exciter field winding 36.

It has been discovered that if one of the diodes 14 through 19 should become shorted, the rotating generator field 11 acts as a voltage energy source in respect of the exciter field winding 36. This voltage energy source influences the voltage at points "A" and "B" in respect of ground. When the generator field 11 acts as a voltage source as when there is a shorted diode present, the negative side of the exciter field winding 36 is limited only by the value of CR2 below ground. The positive end of the exciter field winding 36 pumps energy into capacitor C via electrical lead 32 thereby building up the voltage at point "B". This voltage build up at point B will increase to a level sufficient to back bias the permanent magnet full wave rectifier bridge 31. The voltage at point "B" is now reflected on capacitor C and will cause a field current to flow from point B through capacitor C and diode CR2 thereby influencing the voltage at point A.

Returning to FIG. 3 it will be observed plotted therein is the point A shorted diode voltage curve 72 and point B shorted diode voltage curve 73. It can be seen that at all load currents the voltage difference between the good diode voltage curves 70 and 71 is always less than the voltage difference between shorted diode voltage curves 72 and 73.

Figure 4:
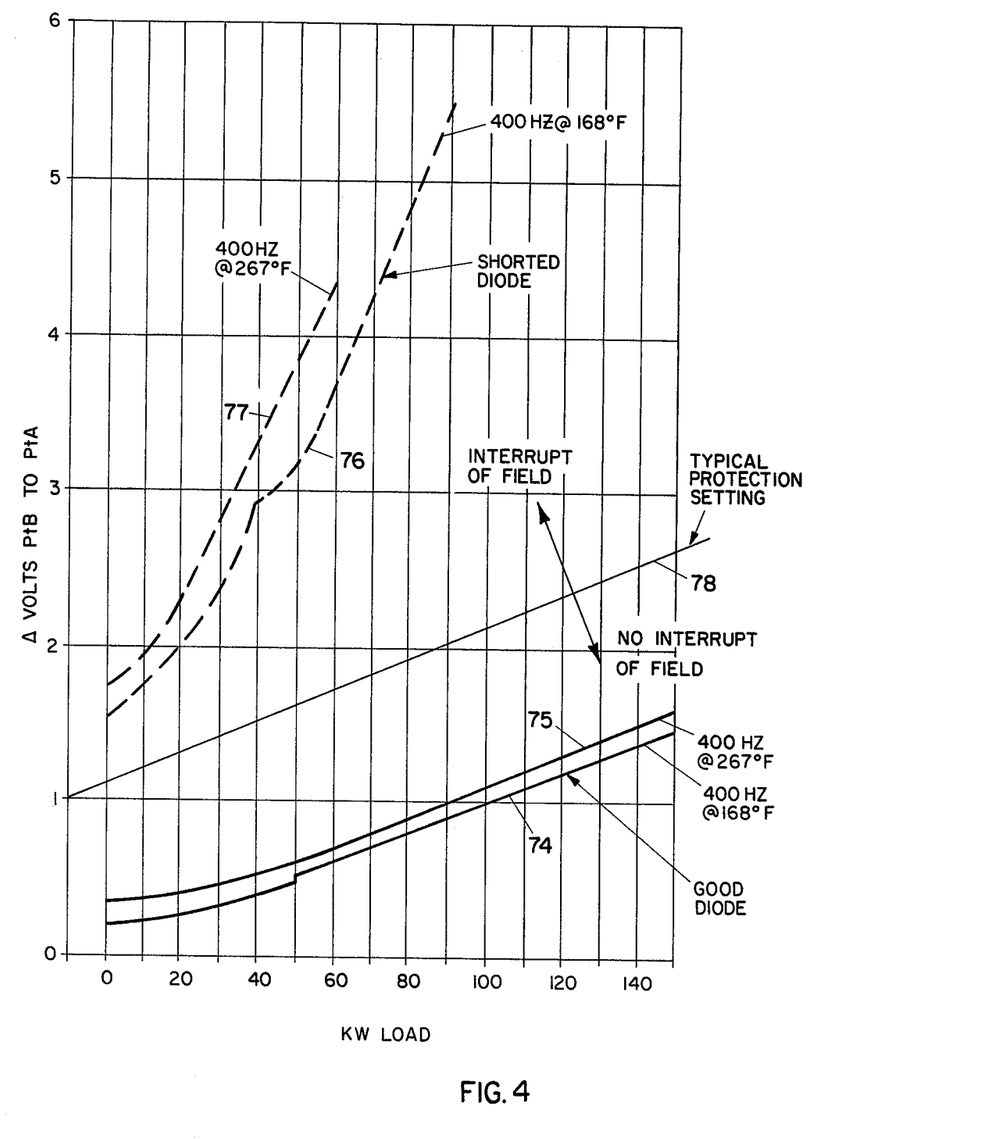
FIG. 4 is a graph illustrating the location of the preset values in the inventions microprocessor shown located between the shorted and non-shorted operating characteristics of FIG. 3.

FIG. 4 is a plot of exciter field winding voltage difference curves plotted over the normal generator load current range. Solid "good diode" voltage difference curves 74 and 75 are shown falling within a predictable range of values with the generator operating at the same frequency but at different temperatures. Broken line "shorted diode" voltage difference curves 76 and 77 are seen to fall within a higher range of values.

A protection setting curve 78 represents preset values stored in the microprocessor 60. Whenever the absolute value of voltage difference across the exciter field winding 36 is above the protection setting curve 78, the generator control relay driver and relay 63 is activated to interrupt the energization of the exciter field winding 36 by opening normally closed breaker contacts 37, 38, 39 via mechanical connection 64, as shown in FIG. 1.

Reference is now made to FIGS. 2a through 2d inclusive, which are timing charts for a generator operating with no load at 400 Hz. FIGS. 2a through 2d are to be studied in conjunction with the generator system of FIG. 1.

FIG. 2a plots the voltage at point A versus time and illustrates the idealized full wave rectified square wave forms 80, 81, 82, and 83 delivered by full wave rectifier bridge 31. In time, at the end of square wave 83 a shorted diode occurs and it can be seen that while peak voltage rises, the average voltage drops from 131.6 volts DC to 115 volts DC.

FIG. 2b shows the plot of voltage at point "B" over the same time period as FIG. 2a and illustrates during the shorted diode condition an increased voltage as indicated by reference numeral 85.

In FIG. 2c, the resistor divider output voltages representative of points A and B, are plotted separately as indicated by the legend on the figure. The sudden increase in the $V_B - V_A$, at point in time 86 is recognized by the microprocessor 60 as being of a value greater than the preset value of protection setting curve 78 of FIG. 4 and the microprocessor 60 provides the output shown in FIG. 2d.

Figure 5:
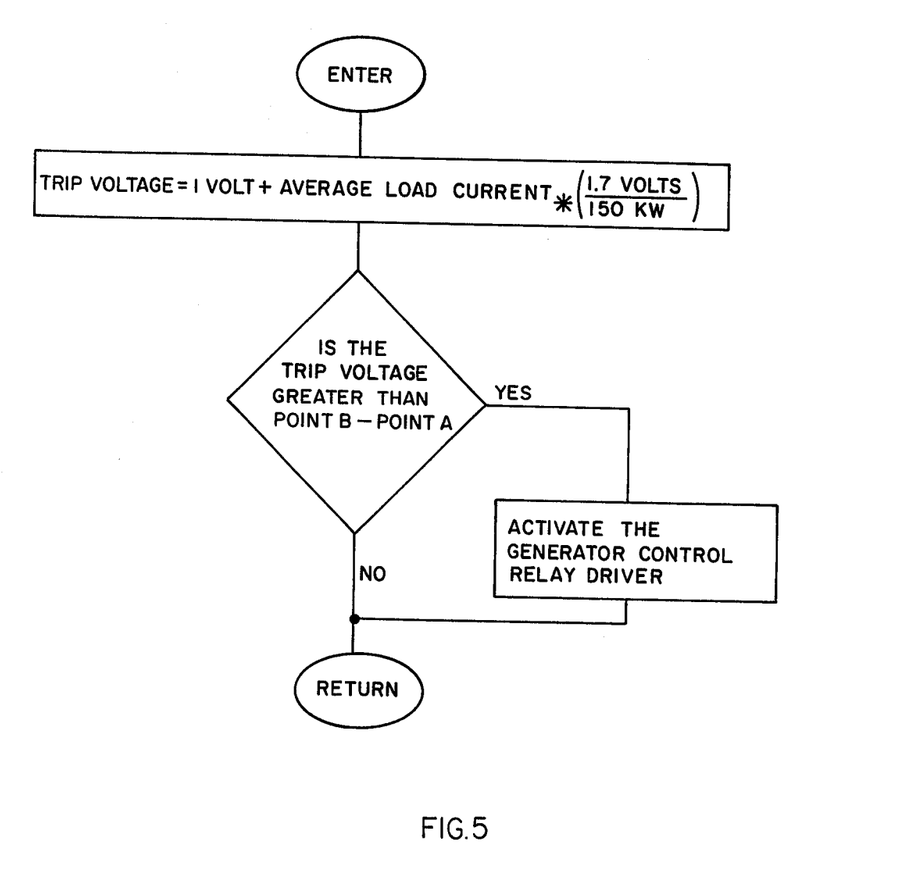
FIG. 5 is a flow chart illustrative of a program that is suitable for the microprocessor of FIG. 1.

Reference is now made to FIG. 5. In FIG. 5 there is shown a simple program, the details and dynamics of which have heretofore been described with respect to the shorted diode protection system of the invention.

From the foregoing it can be readily appreciated that the invention descbived provides a brushless alternating current generator with shorted diode protection free the need to detect and use field current or field current ripple to provide the shorted diode protection. All of this is advantageously accomplished by the detection of a voltage difference across an exciter field winding that causes the energization of the exciter field to be interrupted whenever the voltage difference across the exciter field winding exceeds a preset value stored in a microprocessor system.

Although this invention has been illustrated and described in connection with the particular embodiment illustrated, it should be apparent to those skilled in the art that various changes may be made therein without departing from the spirit of the invention as set forth in the appended claims, such as, but not limited to the substitution of analog circuits for the multiplexer, converter and microprocessor combination shown and described.

I claim:

1. A shorted diode protection system for a brushless alternating current generator of the type having an energizeable exciter field winding, said system including:

means for sensing a voltage difference across said exciter field and pairing said voltage difference with generator load current at the instant said voltage difference is sensed, said sensing means thereby providing an output signal that depends upon said instantaneous voltage sensed and said load current, said output signal falling within a predictable range of voltage difference values over a normal generator load current range, said output signal falling within a higher range of voltage difference values upon the occurrence of a shorted diode, said means for sensing said voltage difference being electrically coupled across said exciter field and including multiplexer means electrically coupled across said exciter winding and to a microprocessor means included in said means responsive to said output signals, said multiplexer means adapted to receive signals from either side of said exciter winding and a control signal from said microprocessor means, means responsive to said output signal such that whenever said output signal representing a voltage difference exceeds a preset value of voltage difference at any given load current in said normal load current range, an output is generated that interrupts the energization of said exciter field.

2. The system of claim 1 which includes in combination a load current sensing circuit means coupled to an output of said generator, said load current sensing circuit means having an output coupled to said multiplexer means.

3. The system of claim 2 wherein said means for sensing said voltage difference includes a converter means electrically coupled to an output from said multiplexer means, which converter means provides said output signal to said microprocessor means, said converter means providing said output signal that is representative of said predictable range of voltage difference values and is in said higher range of voltage difference values upon said occurrence of said shorted diode.

4. The system of claim 3 wherein said means responsive to said output signal further includes a generator control relay driver electrically coupled to a relay, said relay controlling the interruption of the energization of said exciter field.

5. The system of claim 4 wherein said microprocessor means has stored therein a range of preset voltage difference values over said normal load current range, such that whenever said output signal exceeds a preset voltage difference value at any given load current in said normal range, said relay is activated to interrupt the energization of said exciter field.

6. The system of claim 5 wherein in there is included a resistance means that is controllably electrically connected across said excitation field winding upon activation of said relay to thereby damp out any generator self-excitation.

7. In a brushless alternating current generator having a provision for shorted diode protection free from the need to detect and use field current or field current ripple to provide said protection, said generator including in combination, a stationary armature member and a rotatable member carrying a field winding, an exciter having a stationary member carrying a field winding and an armature member rotatable with said rotatable member of the generator, rectifier means mounted for rotation with said rotatable member and electrically connected between the exciter armature member and the generator field winding to supply direct current excitation thereto, means for supplying direct current to said exciter field winding, means for sensing a voltage difference across said exciter field and pairing said voltage difference with generator load current at the instant said voltage difference is sensed, said sensing means thereby providing an output signal that depends upon said instantaneous voltage sensed and said load current, said output signal falling within a predictable range of voltage difference values over a normal generator load current range, said output signal falling within a higher range of voltage difference values upon the occurrence of a shorted diode, said means for sensing said voltage difference being electrically coupled across said exciter field and including multiplexer means electrically coupled across said exciter winding and to a microprocessor means included in said means responsive to said output signals, said multiplexer means adapted to receive signals from either side of said exciter winding and a control signal from said microprocessor means, means responsive to said output signal such that whenever said output signal representing a voltage difference exceeds a preset value in said normal load current range, an output is generated that interrupts the energization of said exciter field.

8. The system of claim 7 which includes in combination a load current sensing circuit means coupled to an output of said generator, said load current sensing circuit means having an output coupled to said multiplexer means.

9. The system of claim 8 wherein said means for sensing said voltage difference includes a converter means electrically coupled to an output from said multiplexer means, which converter means provides said output signal to said microprocessor means, said converter means providing said output signal that is in said predictable range of values and is in said higher range of values upon said occurrence of said shorted diode.

10. The system of claim 9 wherein said means responsive to said output signal further includes a generator control relay driver electrically coupled to a relay, said relay controlling the interruption of the energization of said exciter field.

11. The system of claim 10 wherein said microprocessor means has stored therein a range of preset voltage difference values over said normal load current range, such that whenever said output signal exceeds a preset value at any given load current in said normal range, said relay is activated to interrupt said exciter field.

12. The system of claim 11 wherein there is included a resistance means that is controllably electrically connected across said excitation field winding upon activation of said relay to thereby damp out any generator self-excitation.

* * * * *